T. A. BISSELL.

Car-Axle Box.

No. 8,940. Reissued Oct. 21, 1879.

Attest:
A. Barthel
Charles J. Hunt.

Inventor.
Thos A Bissell
Per Atty
Thos S. Sprague

N. PETERS, PHOTO-LITHOGRAPHER, WASHINGTON, D. C.

UNITED STATES PATENT OFFICE

THOMAS A. BISSELL, OF DETROIT, MICHIGAN.

IMPROVEMENT IN CAR-AXLE BOXES.

Specification forming part of Letters Patent No. 193,593, dated July 31, 1877; Reissue No. 8,940, dated October 21, 1879; application filed May 6, 1879.

*To all whom it may concern:*

Be it known that I, THOMAS A. BISSELL, of Detroit, in the county of Wayne and State of Michigan, have invented an Improvement in Car-Axle Boxes, of which the following is a specification.

My invention consists, first, in a removable shoe incasing or holding the journal-brass, and provided with a pendent flange at its front end, which hangs down in front of and a short distance from the end of the axle, in combination with the stop-plate carried by such flange; second, in the peculiar construction of the removable shoe; third, in the peculiar construction of the stop-plate; fourth, in the combination of the peculiar shoe, brass, and stop-plate, and the means for connecting those parts together; fifth, in providing an axle-box having the usual dust-excluding packing with an oil-pocket in its bottom extending close up to the journal, and with a forked plate riding loosely on the axle-collar and adapted to return its drip to the oil-pocket, whereby all the oil passing back onto the axle-collar is returned to the oil-cellar instead of passing back and out of the box, and a greater depth of oil in the cellar will be maintained; and, sixth, in constructing an axle-box provided with the usual dust-excluding packing, with a slot in its top in front of the packing-slot, and immediately above the axle-collar, to receive a forked plate which rides loosely through said slot upon the axle-collar, all as fully hereinafter explained.

Figure 1:
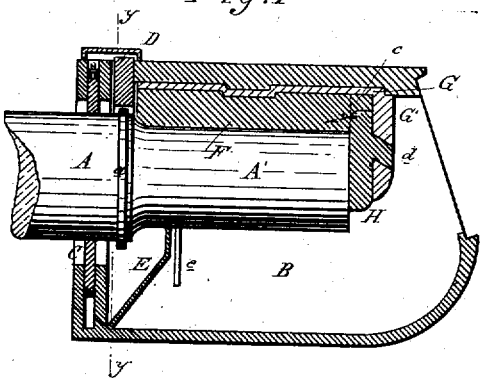
Figure 2:
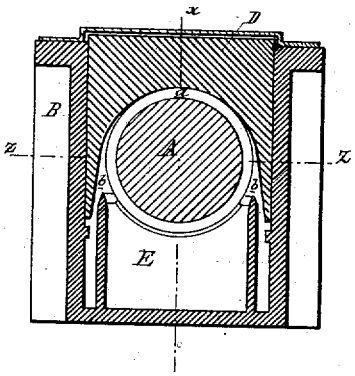
Figure 3:
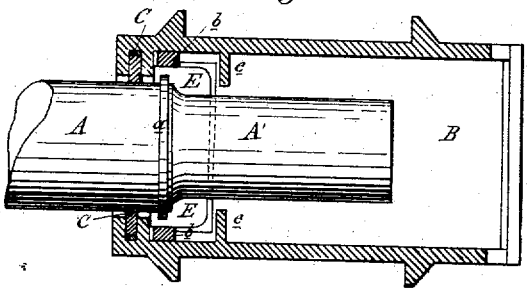
Figure 4:
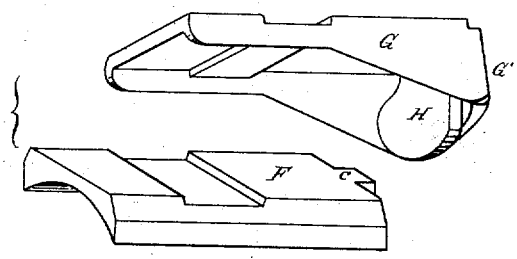

In the drawings, Figure 1 is a longitudinal vertical section of an axle-box inclosing a section of an axle, taken on the line *x x* in Fig. 2. Fig. 2 is a cross-section of the same, looking to the front, on the line *y y* in Fig. 1. Fig. 3 is a sectional plan at *z z* in Fig. 2. Fig. 4 is a perspective view of the shoe and stop-plate with the axle-brass removed.

In the accompanying drawings, which form a part of this specification, A represents the axle, having the usual journal A′ and collar *a*. B is the box, provided with the usual packing C to exclude dust. In front of the packing-slot another one is cored in the top of the box, in which is inserted a wooden plate, D, hollowed out on the lower end to ride the axle-collar and take up the oil running onto it, and which drips off from its ends *b b*, at the sides of the box, into the oil-cavity of the box, on the outside of the pocket E, cast or formed in bottom of the back end of the box. The front wall or diaphragm of this box extends close up to the journal of the axle, which thereby increases the capacity of the oil-cellar, and at the same time any dirt or dust coming into the back of the box through the packing is caught in the pocket and prevented from mingling with the oil to abrade the journal and brass.

F is a light metal bearing or brass, which in the present case is cast or formed with a lug, *c*, at the front end, and it is held or incased in a metal shoe, G, provided with a pendent flange, G′, at the front end. An eye is formed in the pendent flange G′ to embrace a lug, *d*, formed on the light brass or metal bearing stop-plate H, against which the end of the axle comes, and which limits the end play of the latter. A socket is formed in the top of the plate H to receive the lug *c* of the journal-brass.

At each side of the box is a projecting guard-wing, *e*, to prevent the waste from being pushed around the pocket in packing the box, and thereby insuring a free flow of oil from the sides of the pocket to the body of the cellar.

It will be noticed that, by reason of the stop-plate being removably pendent from a point above the axle—in the drawings from the shoe—no obstruction is offered to the packing of the box with the usual waste at the sides and beneath the journal, while, if the removable stop is supported upon a bar extending across the axle-box from side to side, upon a level with the axle, such support will so obstruct the operation of packing as to require its removal, generally, every time the waste is renewed, removed, or attended to; and in the hurry of packing the boxes of a train it frequently happens, especially when the weight of the car has caused a slight settlement or displacement of the parts, that the operator has not time or is unable to replace the stop-plate, and the brass becomes ruined by the wear which the stop-plate is intended to prevent.

My invention and construction obviates this difficulty by affording ready access to the box without the necessity of removing and replacing any of the parts.

What I claim as my invention, and desire to secure by Letters Patent, is—

1. The combination, in an axle-box, of the removable shoe incasing the journal-brass, and provided with a pendent flange at its front end, substantially as described, with the stop-plate carried by said flange, for the purposes specified.

2. The shoe G for axle-boxes, having side flanges to inclose the brass and a flange, G′, at its front end, provided with an eye to support the stop-plate, substantially as described and shown.

3. The stop-plate H for axle-boxes, having a lug, *d*, for supporting the same, substantially as described and shown.

4. In an axle-box, the combination of the removable shoe G G′, brass F *c*, and stop-plate H *d*, constructed and connected together substantially as described and shown.

5. In an axle-box having the usual dust-excluding packing, the combination of an oil-pocket extending close to the journal and the forked plate D, adapted to ride loosely on the axle-collar and return its drip to the oil-cellar, constructed and arranged substantially as described and shown.

6. An axle-box having a slot in its top for the usual dust-excluding packing C and another slot in front of the packing-slot, and immediately above the axle-collar, for the reception of the forked plate D, so that when the parts are in place said forked plate will ride loosely upon said collar, substantially as described and shown.

THOMAS A. BISSELL.

Witnesses:
H. S. SPRAGUE,
CHAS. J. HUNT.